Figure 1:
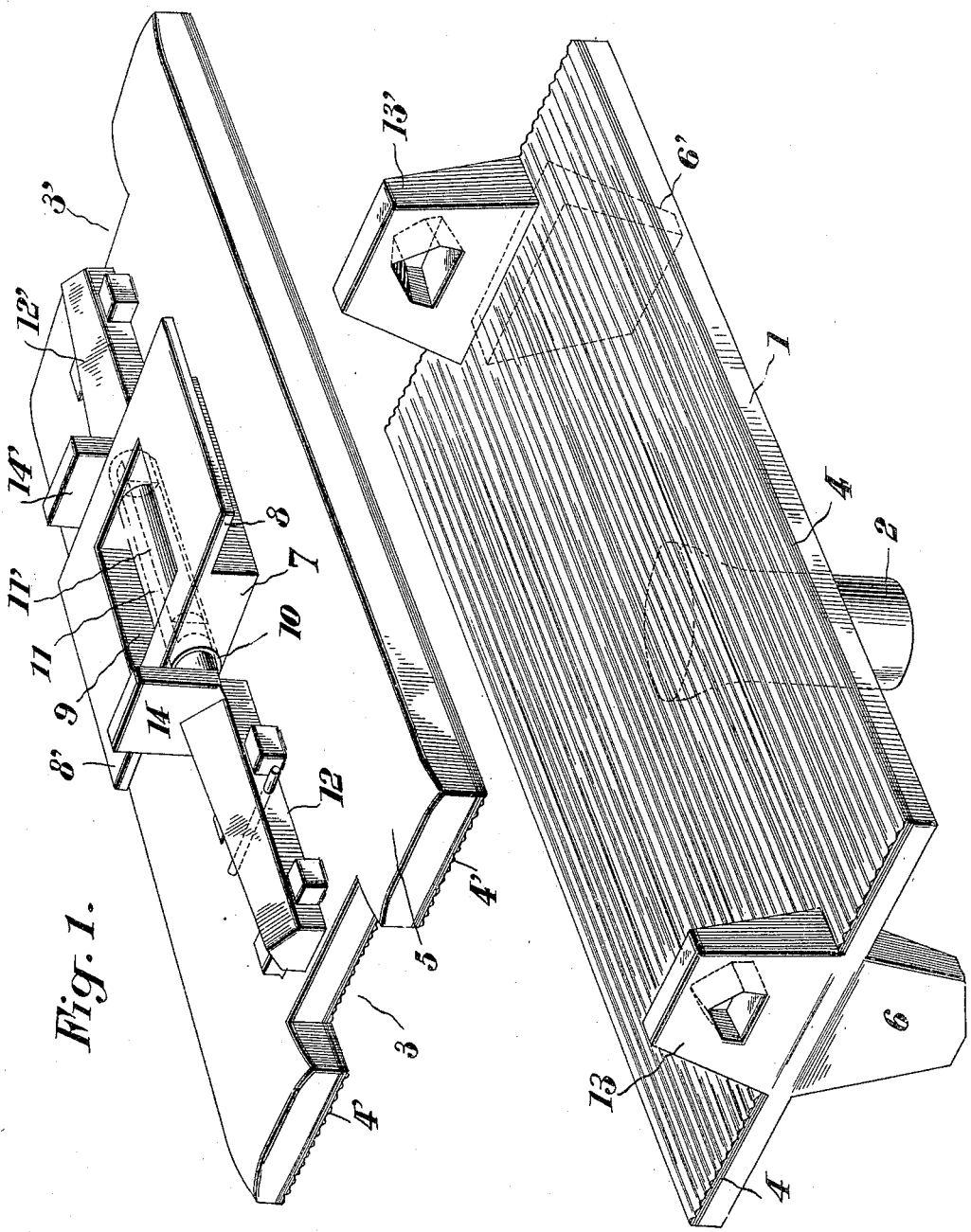

V. HUGLO.
HACKLING MACHINE.
APPLICATION FILED FEB. 18, 1913.

1,110,937.

Patented Sept. 15, 1914.
11 SHEETS—SHEET 3.

Witnesses:

Inventor: Victor Huglo
Attorney.

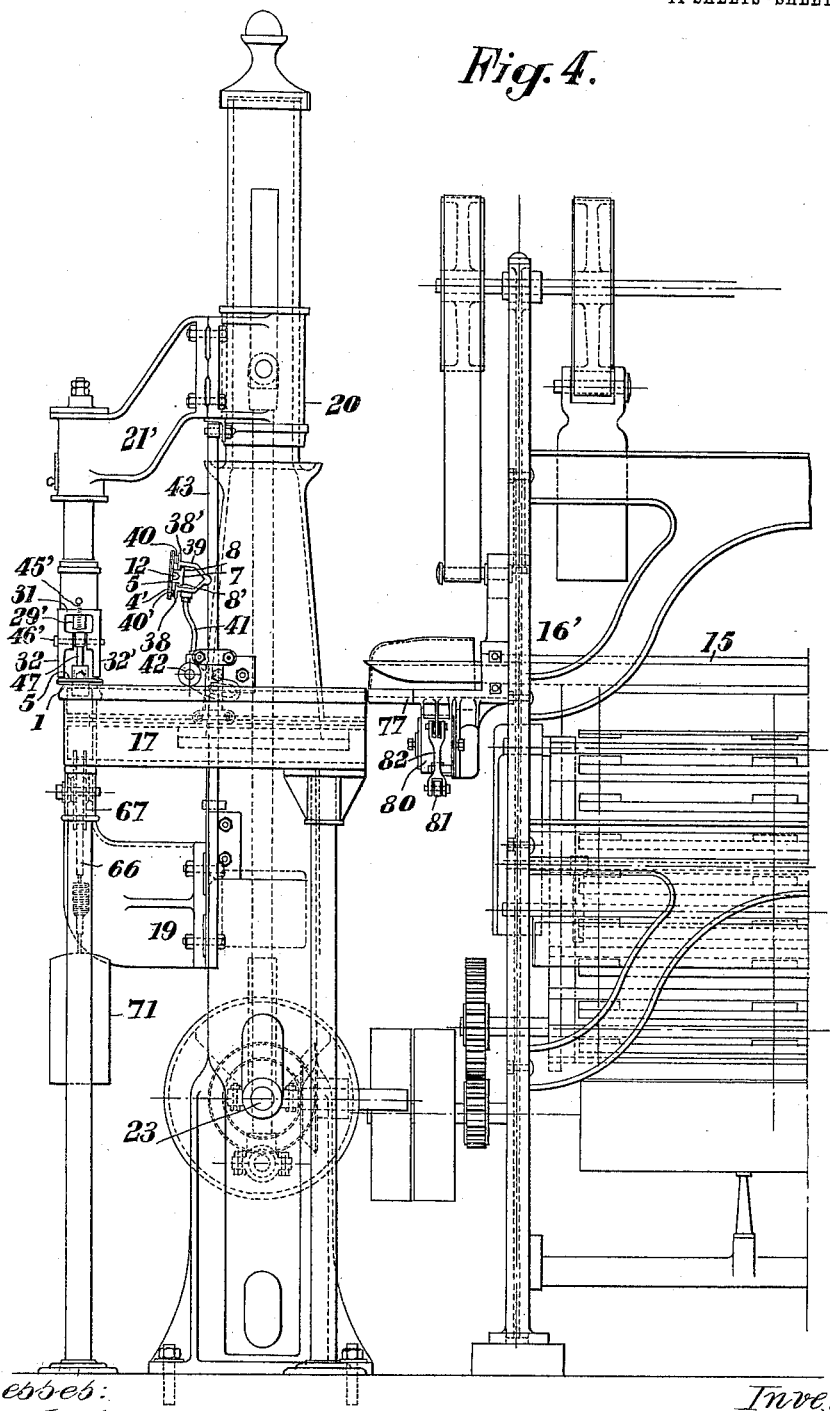

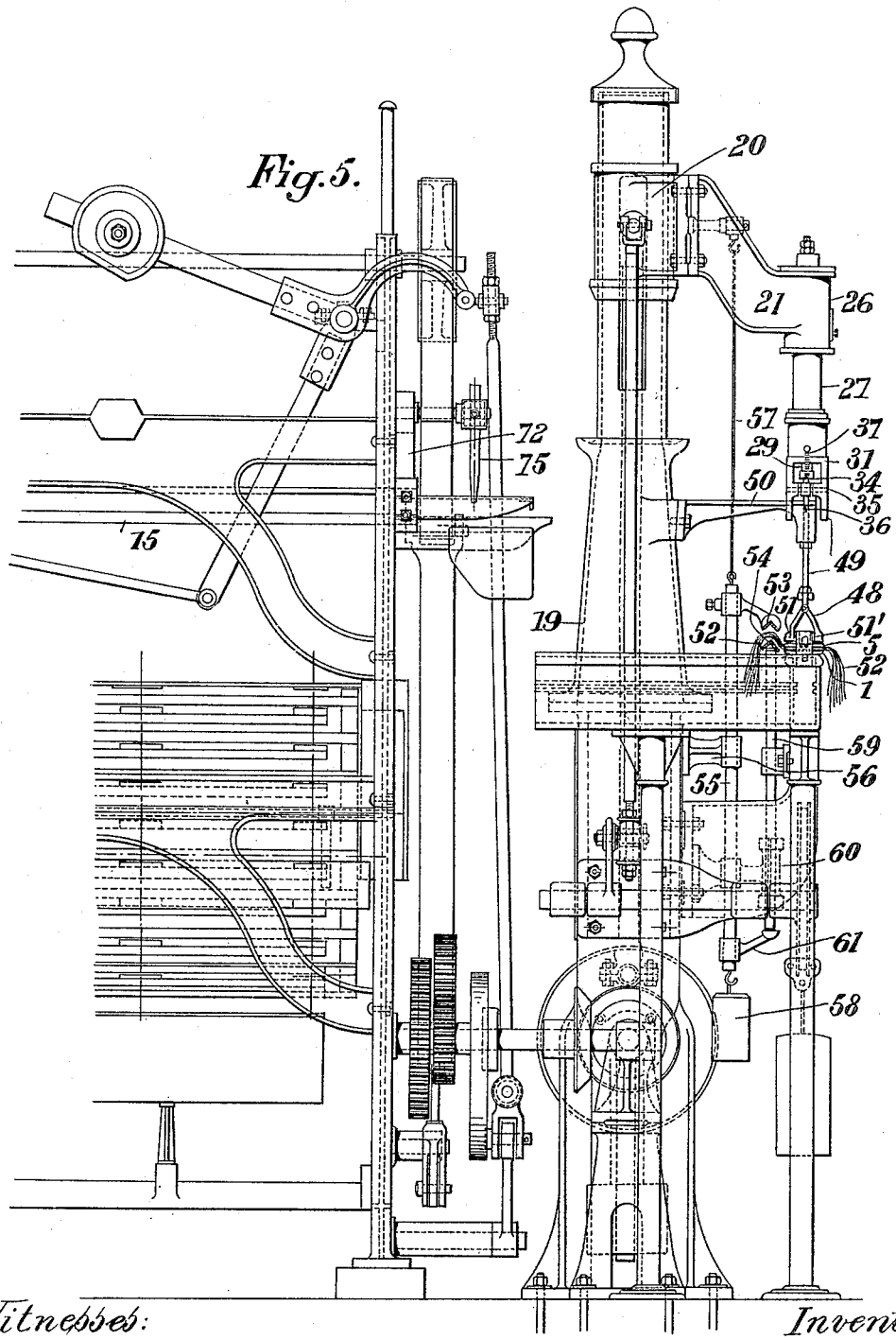

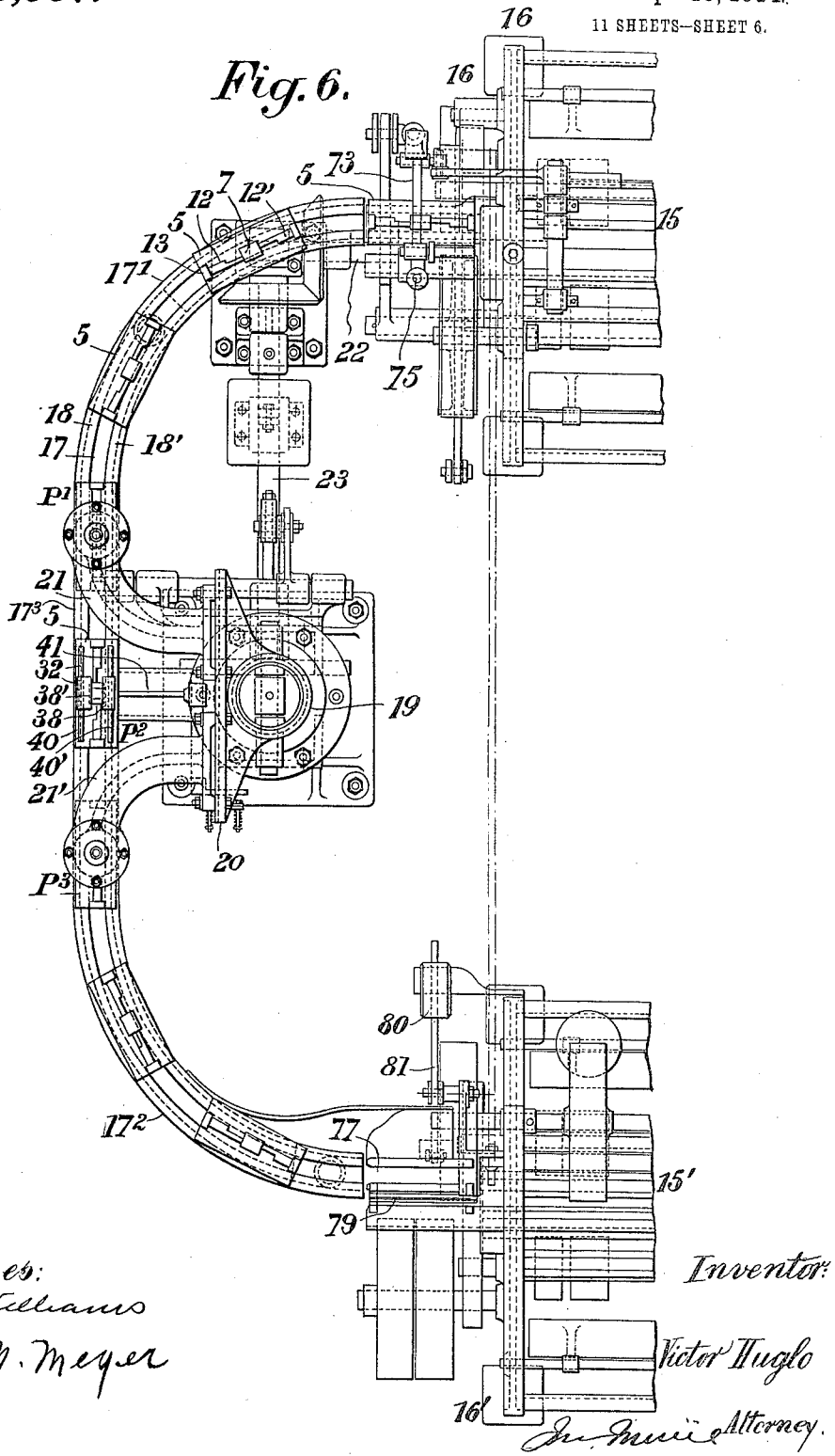

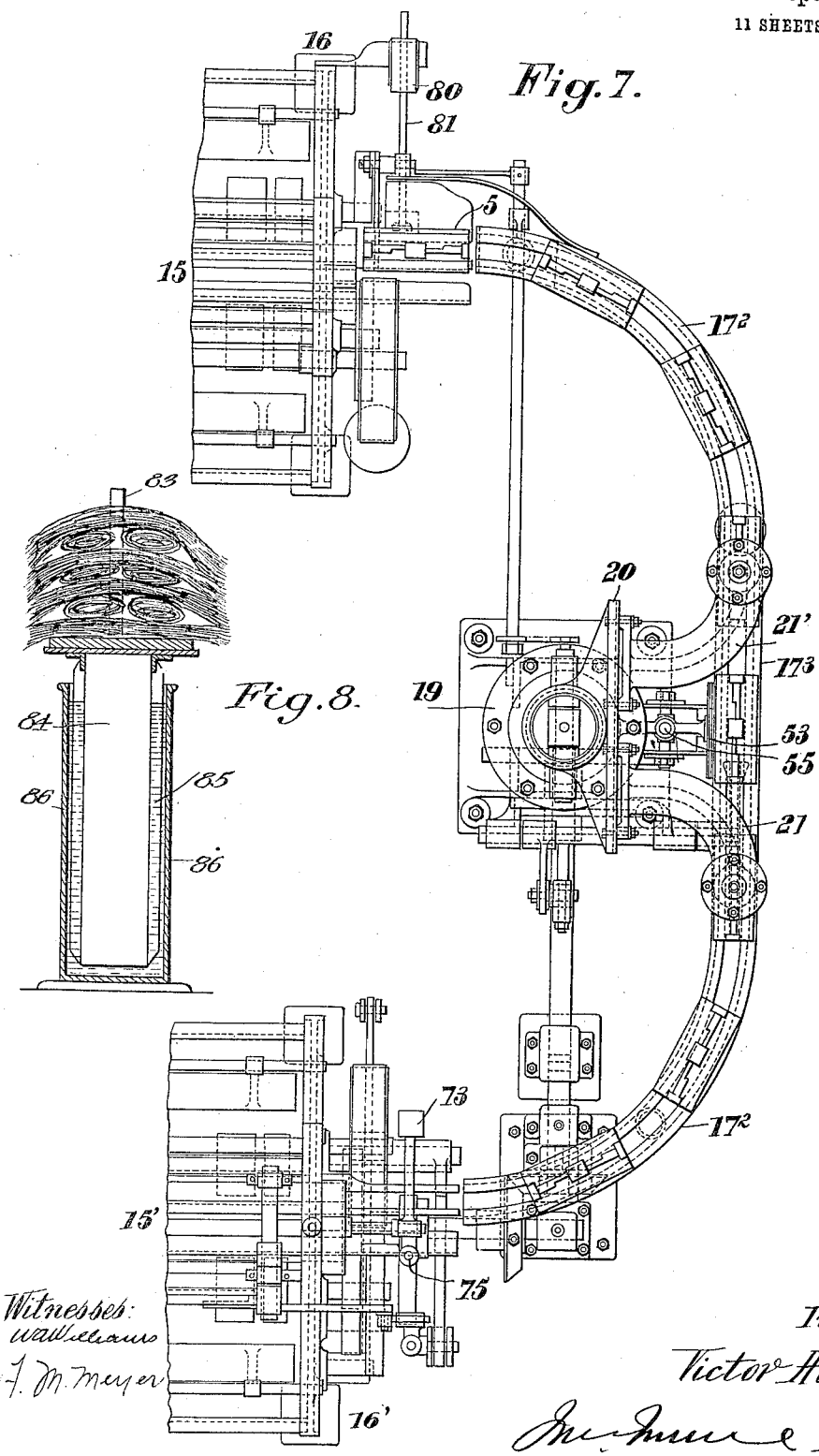

V. HUGLO.
HACKLING MACHINE.
APPLICATION FILED FEB. 18, 1913.

1,110,937.

Patented Sept. 15, 1914.
11 SHEETS—SHEET 8.

V. HUGLO.
HACKLING MACHINE.
APPLICATION FILED FEB. 18, 1913.

1,110,937.

Patented Sept. 15, 1914.
11 SHEETS—SHEET 10.

Witnesses:
W. A. Williams
Dudley Browne

Inventor
Victor Huglo
McInnie Attorney

V. HUGLO.
HACKLING MACHINE.
APPLICATION FILED FEB. 18, 1913.

1,110,937.

Patented Sept. 15, 1914.
11 SHEETS—SHEET 11.

Witnesses:
W. A. Williams
Dudley Browne

Inventor:
Victor Huglo
[signature] Attorney

UNITED STATES PATENT OFFICE.

VICTOR HUGLO, OF LILLE, FRANCE.

HACKLING-MACHINE.

1,110,937.  Specification of Letters Patent.  Patented Sept. 15, 1914.

Application filed February 18, 1913. Serial No. 749,258.

*To all whom it may concern:*

Be it known that I, VICTOR HUGLO, a citizen of the French Republic, and resident of Lille, France, have invented certain new and useful Improvements in Hackling-Machines, of which the following is a specification.

This invention relates to hackling machines of the type adapted for use with flax, hemp or the like, and has for its primary object the provision of mechanism of the character set forth which shall overcome many of the difficulties inherent to such machines.

A further object of this invention is to provide improved holders for such machines more particularly adapted for efficient use and operation.

A still further object is to provide simple and positive operating means for opening the holders carrying the flax.

A further object is to provide mechanism for tightening the holders and means for closing the said holders.

A still further object is to provide a flax or hemp hackling machine of the character described having mechanism for turning over the holders and securing a continuous movement of the holder through the machine, with the minimum of attention and maximum of efficiency.

With these and other objects in view the invention consists in the peculiar arrangement and combination of the various parts of a hemp or flax hackling machine as hereinafter described and more particularly pointed out in the appended claims.

The holders for hemp and flax hackling machines are formed by two plates guided on each other one of which, the bottom plate carries secured in its center a screw which passes through a corresponding hole provided in the center of the other plate, the lid, the said screw being adapted to receive a tightening nut. The well known automatic screwing mechanisms have for their object to unscrew mechanically the said nut to remove the lid of the holder in order to allow of the latter being refilled, to replace the lid, to place the nut upon the screw, to produce the tightening home of the nut these operations being carried out by means of a frictional disk in order to avoid the breaking of parts. The automatic screwing mechanisms perform all the useful movements connected with the hackling of the fiber. The holders mentioned above have numerous drawbacks. They do not allow of the surface of their plates being completely made use of owing to the bolt passing through the center of the latter. The operator when filling the holder with fiber forms a greater thickness of hemp or of flax around the central screw, for the central fibers which have been deflected from the rectilinear direction are piled up on each side of the screw and the traction exerted upon the pieces when the latter are changed or shifted, strains the fibers. The poor distribution of the fiber produces an objectionable grip whatever the power of the latter. The tendency is to use longer and longer holders but this tendency reduces the efficiency of the grip; the good holding of the fiber decreases more and more from the center *i. e.* from the screw up to both ends of the holder where it is the less sure as the defects in the tightening due to the causes mentioned above are multiplied there by the length of the holder.

The automatic screwing mechanisms coöperating with the screw holders are extremely complicated and very expensive. They are subjected to numerous breaks of parts, interruptions in their work so that they require the continuous and attentive attendance of a good mechanic, thus materially increasing the cost of operation of the machine.

The automatic screwing devices are always mounted on a pair of hackling machines, the devices receiving the holders when coming out of one of the hackling machines, present them to the screwing mechanism while tilting them in one direction; after the screwing has been carried out they tilt them in the other direction to present them to the second hackling machine. These tilting members are the most important members of the whole screwing mechanism, in this respect too the well known systems are very delicate. In the system comprising pivots a rotating device receives the holder and presents it to an intermediate track or channel intended to hold the holder to be filled, while a second member takes the holder up and while performing a pivoting movement transmits it to the other hackling machine. This device comprises a very complicated set of hinged levers provided at the ends of the two hackling machines coupled together. These intricate mechanisms placed at the four transferring points for the holders must permit of absolute coincidence between the pivoting device and the holder carrying track or channel and this with an exactness which is absolutely indispensable, otherwise will occur breaks of parts and interruptions of the service which are very costly and take place only too frequently in the well known automatic screwing mechanisms.

This invention has for its object to do away with the drawbacks cited above and to this effect it provides a novel system of holder combined with an ensemble of parts forming the automatic tightening device. As a matter of fact the holder is only an essential member of the tightening device working in coöperation therewith.

Figure 2:
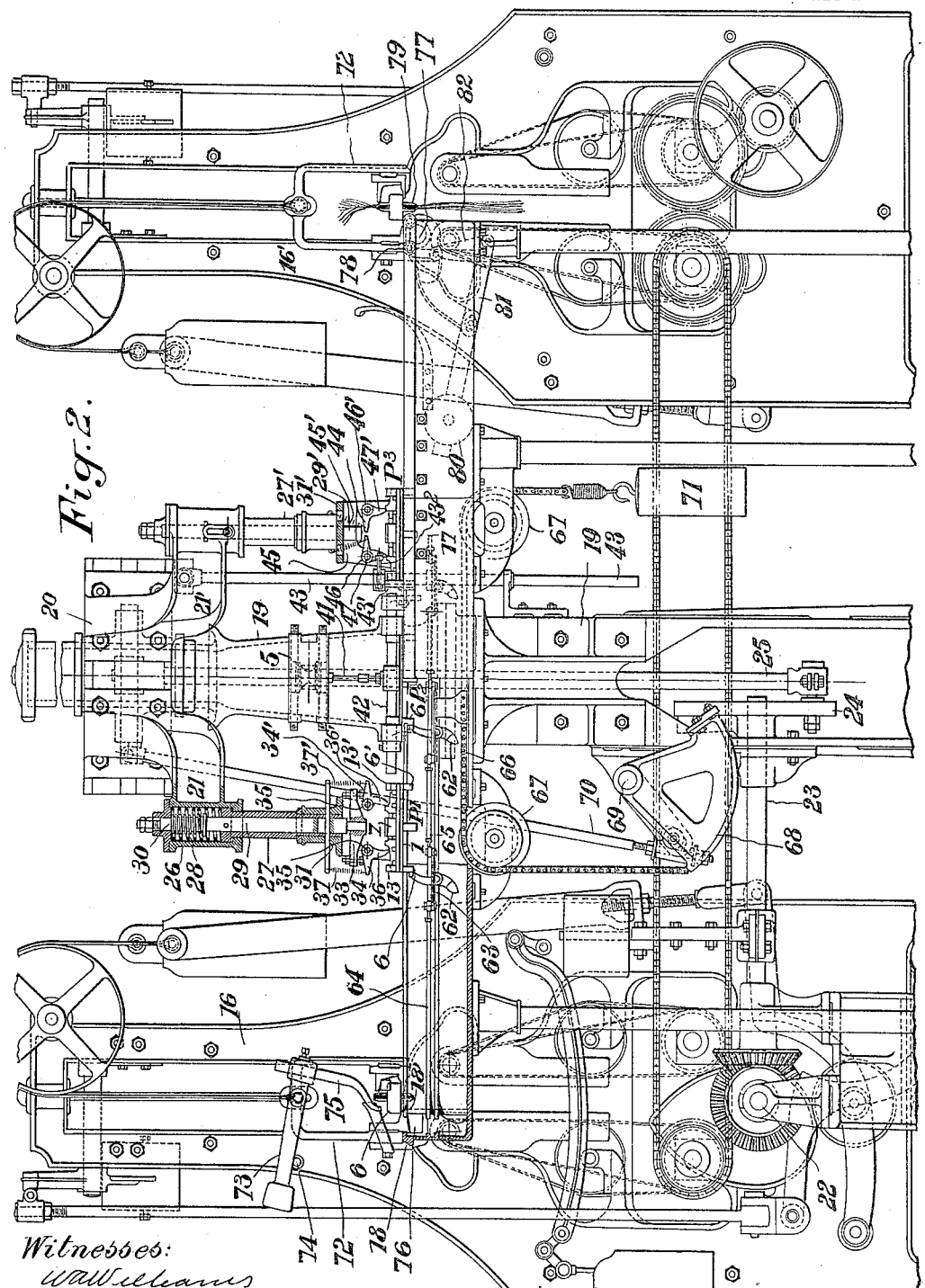
Figure 3:
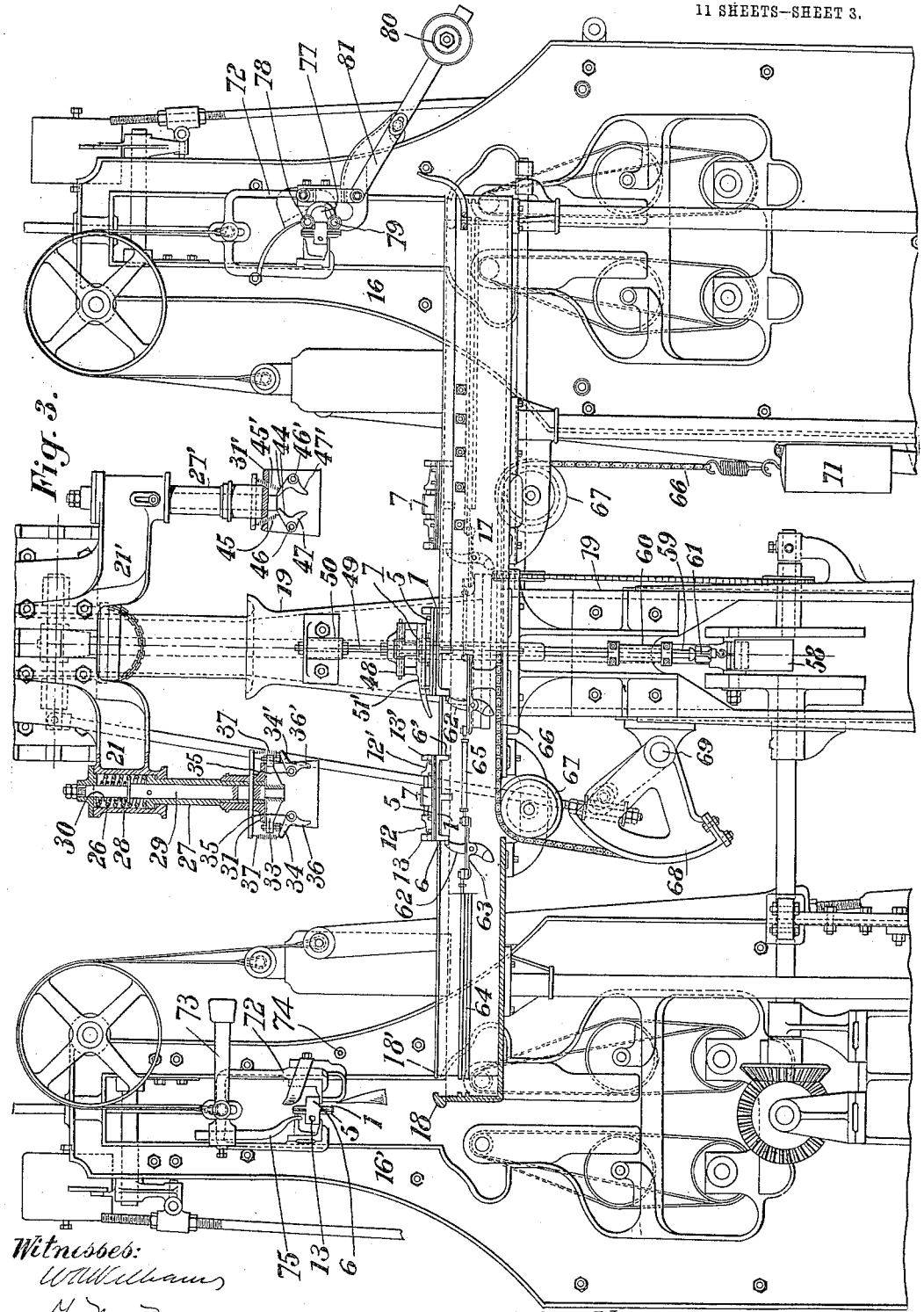
Figure 9:
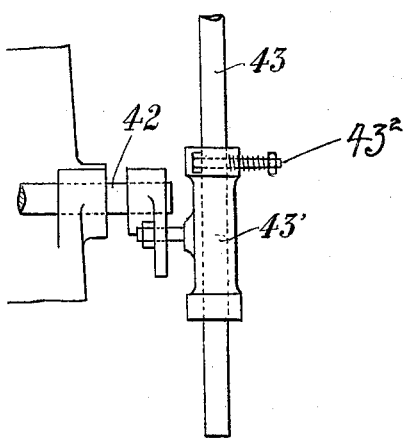
Figure 10:
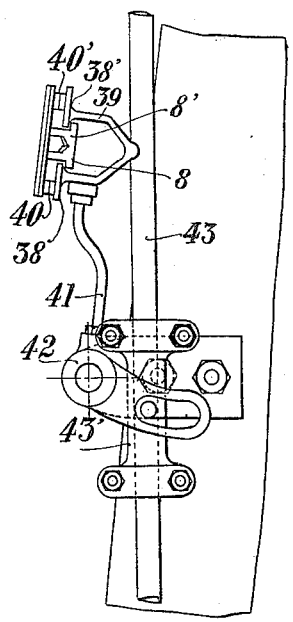
Figure 11:
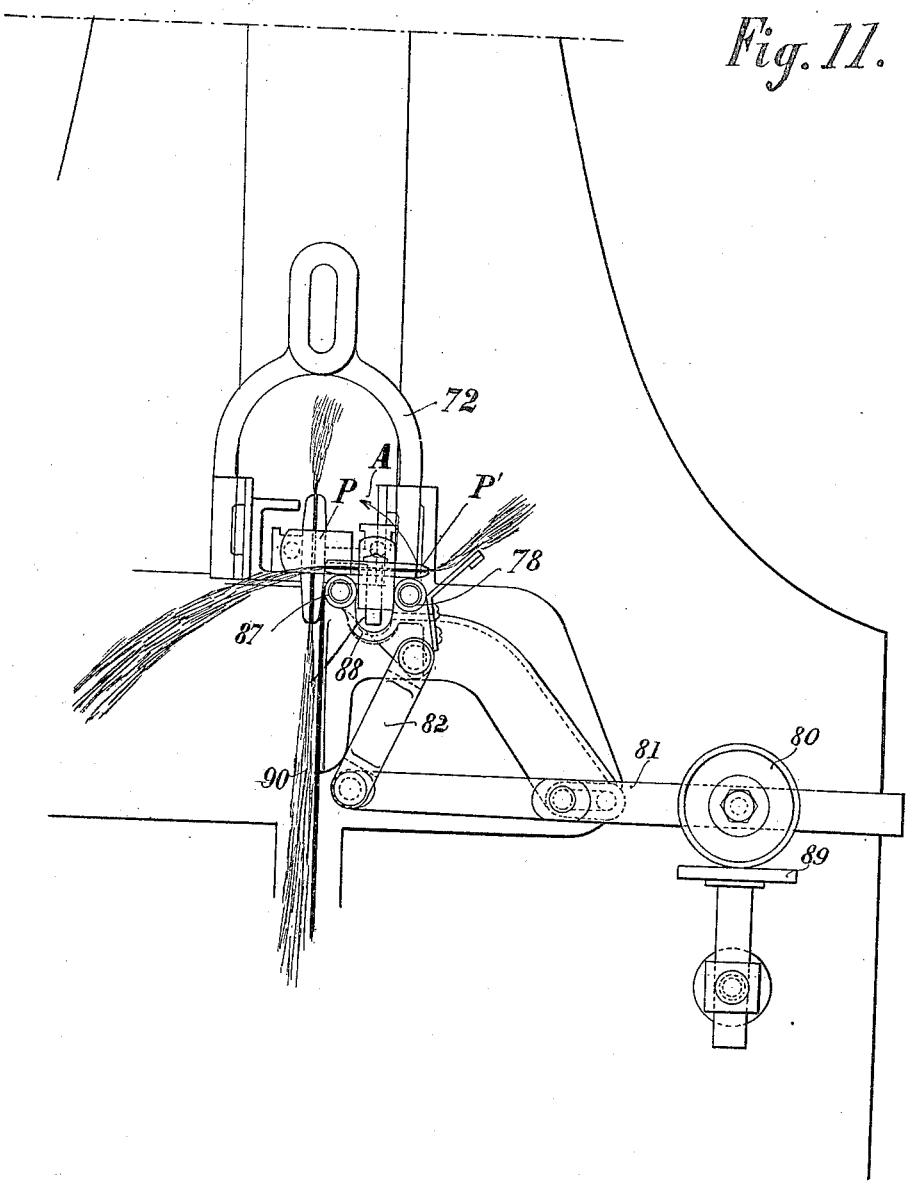
Figure 12:
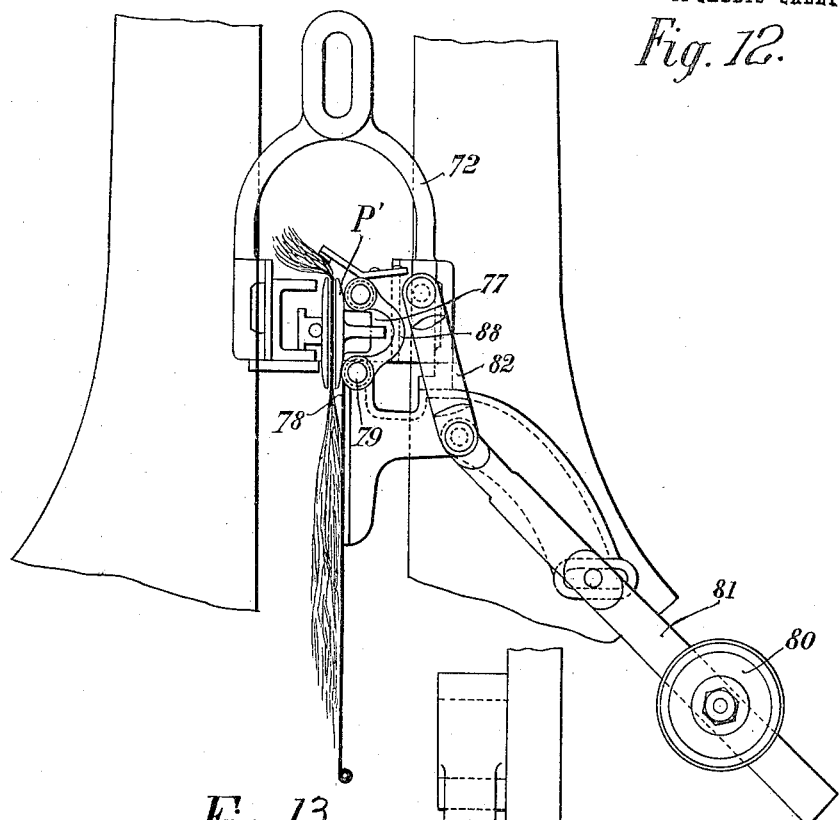
Figure 13:
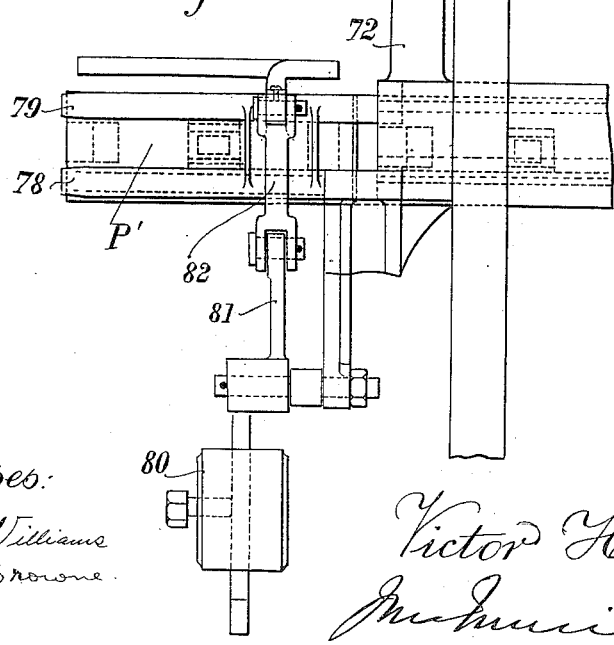
Figure 14:
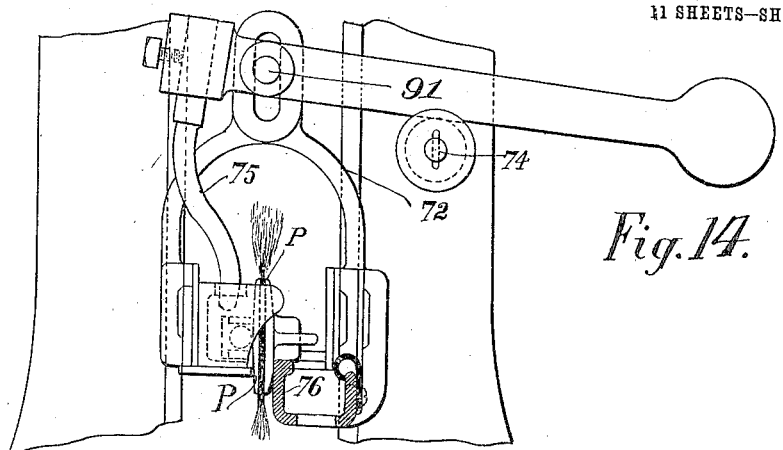
Figure 15:
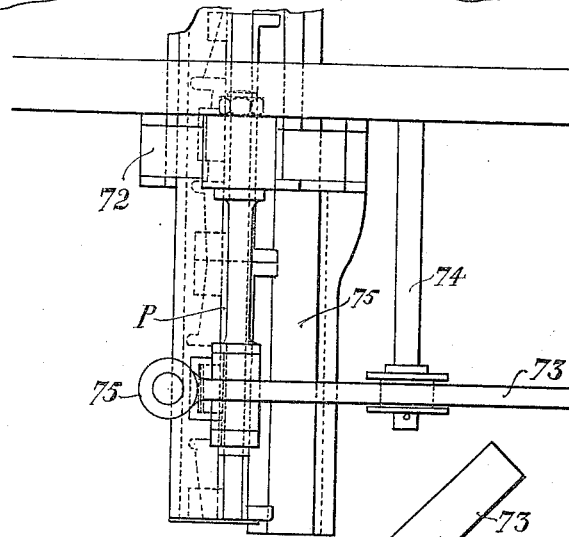
Figure 16:
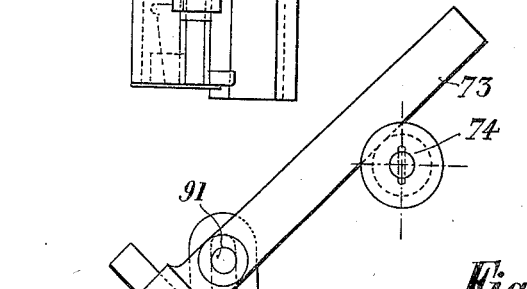

The accompanying drawings given by way of example show one form of embodiment of the invention and in these drawings in which similar reference characters indicate similar parts wherever used; Figure 1 is a perspective view of the holder, the lid being shown removed from the bottom plate. Fig. 2 shows a front view of the tightening device at the filling end, the left side of the figure being shown partially in section. Fig. 3 is a view from the rear or changing end (with partial section on the left) of the tightening device mounted on the rear of the two hackling machines. Fig. 4 shows a side view corresponding to Fig. 2. Fig. 5 shows a side elevation of the tightening device positioned at the opposite end of the two coupled hackling machines. Fig. 6 is the top plan view corresponding to Figs. 2 and 4. Fig. 7 is the top plan view corresponding to Figs. 3 and 5. Fig. 8 is a vertical sectional view of an accessory piece carrier provided with a float. Fig. 9 is a detail view of a portion of the opening and shutting mechanism. Fig. 10 is a detail view of a portion of the lid raising mechanism. Fig. 11 is a detail view of the holder tilting mechanism for the entrance side of the machine, the head of the machine being at the lower end of its course. Fig. 12 is a detail view of the mechanism illustrated in Fig. 11, but in a raised position adapted to turn the holder. Fig. 13 is a top view of the mechanism shown in Fig. 12, the holder entering the hackling machine. Fig. 14 is a detail view of the tilting mechanism at the discharge end of the machine. Fig. 15 is a top plan view of the device shown in Fig. 14. Fig. 16 is a detail view of the tilting mechanism delivering the holder to the track.

The holder comprises as shown by Fig. 1: a metallic lower or bottom plate 1 provided with a lower tractional tenon 2 and with staples 13, 13' provided with wedge shaped holes and positioned at the ends of the plate 1. These staples 13, 13' positioned on one side of the bottom plate and their extensions 6, 6' on the other side serve as guides and propelling abutments to the holder during the operation of the automatic tightening device as will be disclosed later on. The bottom plate 1 can be lined on its inner surface with a layer of india rubber, felt or similar material 4 or simply be corrugated or fluted transversely to the direction of the textile fibers to hold.

A lid 5 is provided at its ends with guide notches 3, 3' which correspond to the staples 13 and 13' of the bottom plate 1. These staples in order to enable them to penetrate with certainty into the notches 3, 3' have the shape of a trapeze the larger basis of which is situated at their bottom and has a length equal to the length of the corresponding notch. The inner surface of the lid is like that of the bottom plate provided with an elastic lining or is corrugated or fluted, as at 4'.

In the middle and on the upper surface of the lid 5 is a projection 7 the flanges 8, 8' of which serve to offer a hold to the jaws or fingers of the lid raiser which will be described later on. Secured into the hollow 9 of the extension 7 is a shaft 10 extending in the longitudinal direction of the holder. This shaft is slidingly engaged, in order to avoid any accidental shifting, by the half cylindrical tails 11, 11' of two locking members 12, 12' the said tails being slid over each other. A small annular spring positioned in the hollow compensates any wear and tear that might occur. These lock bolts or members 12, 12' are wedge shaped in the direction of their length as clearly shown by Fig. 1 and are sloping down toward the outside. When these lock bolts 12, 12' are pushed outward they engage the identical wedge shaped staples 13, 13' of the bottom plate 1 when the cover is applied to the latter. The lock bolts are guided by heels 14, 14' which at the same time limit the movement of the lock bolts by means of a pin.

The lock bolts 12, 12' are provided with pushing lugs 14, 14' which receive in one direction or the other the pushing action of special members (fingers) of the locking or unlocking shoe which will be described later on and which before shifting the lock bolts into their locking position first press the lid upon the bottom plate by acting upon its longitudinal edges, the india rubber linings, 4, 4' and the textile fibers being compressed and acting as elastic cushions. In this manner the lock bolts have nearly no strain at all to sustain and serve rather to fix the tightening pressure than to produce it themselves.

The advantages of this novel holder are derived from its construction and are noticeable at first sight. The length of this holder can be much greater than that of the holders known and in spite of this its tightening action or grip which is obtained all along the holder by means of the shoe and is held (or completed) by the wedge shaped lock bolts, is surprising. The reason is that not only this method of producing the tightening is absolutely reasonable but that, besides due to the total absence of any obstacle on the area of the holder a perfect distribution of the textile fibers can be obtained without any objectionable thicker parts and with less care than before and with two points of bearing instead of a single one. It results from these factors that the tightening or gripping action is absolutely sure at all points of the holder even with a holder twice as long as those actually known.

The connection of the heads or channels 15, 15' of the two coupled hackling machines 16, 16' is carried out at the ends of the latter (with intercalation of holder tilting devices described later on) by means of a direct connecting track or channel 17 which is essentially composed of two parts curved so as to form quarters of a circle 17' and 17'' (Fig. 6) which are preferably connected to each other by means of a straight part $17^3$ (Fig. 6). It is clear that if the radius of the curve has been chosen larger it would be possible to dispense with the straight central part $17^3$. The latter is therefore not an essential feature of the invention. This direct curved connecting channel 17 is composed of two parallel pieces 18, 18' (Fig. 3) which are held at a certain distance from each other to form a guide slot. In the form shown by the drawings the curved direct connecting channel contains besides the side members 18, 18' the device for producing the advancing of the holder each of which latter is designated as a whole by P.

The mechanical working of the holders takes place in the following manner (Fig. 2). Slidingly mounted on the upper part of a hollow frame-work 19 which carries the railway or channel 17, is a slide 20 adapted to slide vertically and is provided with two arms 21, 21' which project above the curved track 17 making the direct connection. The said vertical sliding movement is produced by the main shaft 22 of one of the hackling machines 16 which shaft drives an intermediate cross shaft 23 provided with a crank disk 24 the connecting rod 25 of which passes through the hollow framework 19 from the bottom to the top and acts upon the slide 20.

In order to allow the work being done properly, the holder P' (positioned on the left in Fig. 2) which comes from the second hackling machine must be untightened and unlocked while the lid of the holder P² (central holder in Fig. 2) is being raised so that the operator might remove the hackled textile fiber and replace it by non hackled fiber and while at the same time the holder P³ (Fig. 2 on the right hand side) is again tightened and locked. To this end the arms 21 and 21' each carry a cylinder 26, 26' in which a hollow sleeve 27, 27' is adapted to slide in a vertical direction this sleeve being pushed downward by a powerful spring 28. In the said sleeve slides in turn a concentrical rod 29 which is also pressed downward by a spring 30.

The sleeve 27, 27' carries at its lower part a shoe 31, 31' the side pieces 32, 32' (Fig. 4) of which bear upon the lateral edges of the respective holders when the slide 20 descends and this with the full strength of the spring 28 which is compressed as soon as the side pieces of the shoe 31, 31' touch the lid of the holder. The sleeves 27, 27' being stopped, their lower rod 29 continues descending and the following operation then takes place.

The cross bar 33 with which the lower end of the rod 29 is provided strikes against the outer arms of two bell crank levers 34, 34' which are mounted at their summits and in a reverse position on shafts 35 which are supported by the side pieces of the shoe 31. It follows therefrom that the lower arms or fingers 36, 36' of these bell crank levers are brought toward each other against the action of their respective return springs 37, 37' and while bringing the lugs 14, 14' (Fig. 1) of the holder P' (Fig. 2) together disengage the lock bolts 12, 12' from their staples 13, 13' (Fig. 1). During this time the holder P² has been opened so as to allow the operator to remove the hackled textile fiber and to replace by non hackled fiber. This is carried out in the following manner: As seen from Fig. 1, the lid of the holder is provided with a projection 7 having flanges 8, 8'. When the holders positioned at P' slide into the position P² on the track 17 (see later on how they are propelled) the flanges 8, 8' engage (as shown in Fig. 4) from below the hooks 38, 38' of a pair of jaws 39. These hooks are provided with springs 40, 40' which bear upon the plate of the lid and thus secure a good hold on the latter. The pair of jaws 39 are mounted on an arm 41 which oscillates with a shaft 42 actuated by a connecting rod 43 which is connected with the slide 20. The timing of the movement is such that when the slide 20 descends the pair of jaws 39 and the lid of the holder are rising.

It must be stated that the connecting rod 43 is connected with the shaft 42 through the medium of a box 43' in which the connecting rod 43 slides with a certain amount of friction (brought about by means of a tightening device $43^2$) so that the lid of the holder may be raised but that the hand of an operator when caught under the descending lid could not be injured, the connecting rod sliding in this instance in its box. During the same time, the shoe 31' (positioned on the right hand side of Fig. 2) bears with its side pieces 32, 32' (Fig. 4) on the lid of the recently filled holder P³ and produces in this holder the desired tightening. At this moment the rod 29', continuing its descending motion in a manner similar to that what happens for bringing about the opening of the holder at P', strikes against the lower arms 44 of the bell crank levers which oscillate against their return springs 45, 45' round their shafts 46, 46' which are secured into the side pieces of the shoe 31'. It follows therefrom that the lower arms or fingers 47, 47' of these base crank levers cause the pushing lugs 14, 14' (Fig. 1) of the holder P³ to move away from each other and thus lock this holder which had already been tightened to its full extent. During the following rising motion of the slide 20, the left hand shoe 31 and the right hand one 31' rise and leave the holders P' and P³ after having completed their work while the arm 41 and the pair of jaws 39 descend so as to bring down the lid of the holder P². The guide lugs 6, 6' of the lid 5 (Fig. 1) penetrate into the notches 3, 3' of the bottom plate 1 and the textile fiber is engaged and held without however being tightened. At this moment, the holders are advanced toward the right side on the curved direct connecting track 17. The holder P' is replaced by another one coming from the second hackling machine 16 and is going to take in turn the place of the holder P² which substitutes itself to the holder P³ and so on.

The holder P³ and those which preceded it advance toward the first hackling machine 16' (at the right of Fig. 2). After having passed through this hackling machine, they arrive at the back of the pair of hackling machines where the changing or shifting mentioned in the beginning of this specification is to take place. Before this changing is performed, a shoe which is identical to the shoe 31 produces first the loosening and then the unlocking (i. e. the opening of the holders which arrive one after the other). After the changing or shifting has taken place, a shoe which is identical to the shoe 31' first produces the tightening to its full extent and afterward the locking.

The central lifting device for the changing or shifting (see Figs. 3 and 5) is shaped differently from the lifting device of the front tightening device (Fig. 2). The jaws 48 carried by an arm 49 and a stationary bracket 50, have their two hooks 51, 51' shaped like two slightly inclined planes as shown in elevation by the detail view on the right hand side of Fig. 5, the slope of the said inclines being such that the lid of the unlocked holder, which slides with its flanges 8, 8' (Fig. 1) on the said inclined planes, is just sufficiently lifted, to set the textile fiber 52 free (holder set ajar). The changing device (or more exactly the drawing device) is then free to act. This device is composed, as shown by Fig. 5, of an upper jaw 53 which is positioned directly behind the jaws 48, the said jaw 53 descending and bearing upon the lower jaw 54 so as to grasp the textile fiber 52 and to pull it sufficiently out of the holder that the part of it which has not yet been hackled does no longer escape the action of the hackles of the second machine. This changing or tractional device works as follows: The bar 55 which carries the upper jaw 53 and is suitably guided in arms 56 of the framework, is suspended from the slide 20 through the medium of a cable 57 and carries at its lower end a counter-weight 58. When the slide 20 descends, the weight 58 which is unable to crush the hand of a man between the jaws 53, and 54, applies the upper jaw 53 upon the lower jaw 54 which, mounted on a rod 59 adapted to slide with a certain amount of friction at 60, moves downward while offering a certain resistance. When the slide 20 rises again, an arm 61 of the rod 55 strikes against the rod 59 and causes it to rise but after the rod 55 so as not to hinder the textile fiber which advances with the holder to place itself under the locking shoe. This successive shifting of the holders along a suitable distance is produced by a set of detents or dogs 62 (Fig. 2) positioned in the track 17 and which are adapted to move out of the way when moving backward (toward the left hand side) but remain in an upright position when advancing to the right. It is during this motion that they meet with the tenons or lugs 6 (Figs. 1 and 2) of the holders which they consequently cause to advance in accordance with the requirements of the operations already described. Each dog 62 is mounted on a small sliding plate 63 the edges of which are engaged into a guide-way provided inside the channel or track 17. The small sliding plates 63 are hingedly connected with each other through the medium of adjustable rods 65.

In order to avoid any breaking of parts in case of an obstacle being met with during the advancing motion or in case of something getting out of order, the set of dogs 62 is driven by a special device of which the following is a specification: one of the small sliding dog carrying plates of the set is secured to a Gall chain 66 which is mounted on two pulleys 67. This chain 66 is secured at one end to a sector 68 (which a connecting rod secured to the slide 20 causes to oscillate on its shaft 69) and carries at its other end a counter-weight 71. The movements are timed in such a manner (see drawing) that when the slide 20 descends the weight 71 rises and that afterward the weight 71 acts upon the chain of the dogs 62. In this manner in case of a stop of the dogs, the counter-weight remains in its lifted condition but nothing is broken as this was often the case until now in the actuating devices for the dogs or other carrying devices for the heads or channels of the hackling machines. This novel actuating device comprising a tractional counter-weight is therefore very valuable. It is the safety member of the tightening device.

We have seen in the introduction that the well known devices intended to receive the holders coming out from one hackling machine and to deliver them up to the other hackling machine have many drawbacks because they are not direct acting. Therefore, a great merit of this invention consists precisely in providing a connecting track or channel which is absolutely direct and simple, with a special dog device for producing the advancing. But it is clear that at the place where the holders leave the heads of the hackling machines as well at the place where they enter into them, it is necessary to provide a tilting device for rotating the holders 90° first in one direction (escape end) and then in the other direction (entrance end).

In Fig. 2 is seen on the left hand side the escape end of one of the hackling machines and on the right hand side the entrance end of the other hackling machine. Fig. 3 shows on the left hand side a holder coming out from the head or channel and on the right hand side a holder tilted and ready to enter the head or channel.

The head or channel 72 (Fig. 2 left hand side) which as well known performs a rising and descending motion, carries an oscillating lever 73 provided with a counter-weight and which when the channel descends strikes against an abutment 74 secured to the framework of the hackling machine 16. It follows therefrom that it is tilted over and that an arm 75 with which it is provided strikes laterally against the holder coming out on edge from the head 72 in such a manner that this holder falls with its tenons 2 into the entrance groove 76 of the curved connecting track (railway) 17 where it is picked up by a dog 62. The said entrance groove 76 is integral with the channel 72 of the hackling machine but when the latter goes down it places itself in the prolongation of the track 17. This is the tilting device of the escape side.

As to the tilting device for the entrance side (Figs. 2 and 3, on the right) it is provided with a groove 77 the two edges 78 and 79 of which form the prolongation of the track 17. The channel is adapted to oscillate around its edge 79 which is formed by a pivot shaft integral with the head or channel of the hackling machine 72. The holder when arriving at the end of the railway track, is assuming a flat position in the channel of the tilting device positioned at the filling of the hackling machine. A counter-weight 80 which is mounted on the arm 81 has a tendency to cause the channel 77 to tilt over through the medium of a connecting rod 82 but is prevented from doing so as long as the head or channel of the hackling machine is in its lowermost position. When the head or channel of the hackling machine rises, the counter-weight becomes free and enters into action, causing the channel 77 to tilt over together with the holder and places the latter on edge. The holder entering the tilting device pushes the escaping holder in front of it. Then a dog or detent of the head or channel of the hackling machine engages the holder and carries it on into the hackling machine.

The flax or hemp intended to be used by the filler, is brought near the operator on a wooden horizontal rectangular board carrying in its center a vertical wooden rod 83. The prepared pieces are piled up cross wise as shown by Fig. 8. The complete stack of fiber forms a heap about 0.80 to 1.00 meter high. The filler takes away from this stack the pieces which are to be introduced into the holders. It results therefrom that little by little the height of the heap is reduced and that the operator is obliged to stoop down more and more in order to seize the pieces of fiber and when he arrives at the last pieces he has to do a very tiring work stooping down six or seven times each minute to seize the pieces of fiber which are at the level of his foot. In order to do away with this tiring operation which makes the operator lose a most valuable time for the filling of his holders and which forces him sometimes, especially when he is not very well trained, to let pass holders empty, the inventor has devised to place the stack of fiber on the head of a thick closed tube floating in water or in a liquid which has been rendered aseptic in order to avoid the fermentation after a certain time. This float 84 is provided with ribs 85 providing for the guiding thereof and rests upon the bottom of the cylindrical reservoir 86 when the stack is complete.

By taking pieces of fiber away, the operator lightens the float 84 which rises by and by in proportion to the removal of the pieces. It follows from this arrangement that the upper level of the fibers remains at a constant height and near the hand of the operator and the arrangement described allows the operator to do his work seated without fatigue and at a much greater speed.

Such a device is in accord with the requirements of the rapid work of the automatic tightening mechanisms and therefore has real technical advantages. The apparatus described is placed on the left hand or filling side of the machines. As to the flax withdrawn from the holders, the operator is sufficiently skilled to throw it on the floor; it is consequently not necessary to care about the hackled fiber.

The advantages of the arrangement according to this invention are set forth in the introduction to this specification.

Having now fully described my said invention, what I claim and desire to secure by Letters Patent, is:

1. In a holder of the kind described for fiber hackling machines the combination of a lower plate, carrying means on its outside, an upper plate, interlocking means provided at the ends of said plates, locking and tightening members carried by the said upper plate on its outer side and means allowing of the said locking and tightening members being actuated, substantially as and for the purpose set forth.

2. In a holder for fiber hackling machines, the combination with a lower plate, of trapeze shaped staples at each end thereof and provided with wedge shaped openings therethrough, an upper plate, a notch in each of the end edges of said upper plate and adapted to receive the staples of the lower plate, and means for forcing the plates together to cause the plates to engage.

3. In a holder for fiber hackling machines, the combination with an upper and a lower plate, of a central projection upon said upper plate and provided with a central depression, an axial centrally located guide tube in said depression, a plurality of staples upon said lower plate, a plurality of bolts upon said upper plate adapted to engage said staples, and means for forcing the plates together to cause the plates to engage.

4. In a holder for fiber hackling machines, the combination with an upper and a lower plate, of staples provided with openings upon the lower plates, a central projection upon said upper plate, a centrally located guide tube upon said upper plate, lock bolts on said upper plate, means secured to the upper plate adapted to guide the lock bolts in line with the openings of said staples, a lug upon each of the lock bolts projecting outwardly therefrom, tail pieces upon each of said lock bolts at their inner ends, said tail pieces being inserted in said guide tube and superposed therein, a flange upon said central projection of the upper plate and spaced from the surface of said plate, and means for engaging said flanges to control the parts.

5. In a fiber hackling machine, the combination with fiber holders, comprising upper and lower plates, of tightening means therefor, a plurality of spaced rails, said rails forming a connecting track placed at a height equal to the height of the lowered heads of a hackling machine, a plurality of tenons on the lower plate of said holder adapted to be guided in said track, and means for actuating said holders along said track.

6. In a fiber hackling machine, the combination with a plurality of fiber holders, of a track therefor, means for propelling said holders along said track, comprising a series of hingedly connected dogs adapted to engage said holders, means for reciprocating said dogs, said means comprising a counterweight, a chain carrying said weight, a sector carrying said chain, means for oscillating said sector to cause a forward movement of the series of dogs, and means for raising said counter-weight to permit of a backward movement of the same.

7. In a fiber hackling machine, the combination with a plurality of fiber holders comprising upper and lower plates, of tightening means therefor, a channel track connected with the filling end of the machine, a vertically reciprocating slide mounted above said track, means for operatively connecting said slide and the cam shaft of a hackling machine, whereby to cause the slide to reciprocate, and means operatively carried by the said slide to engage the upper plate of said holders whereby to tighten the same.

8. In a fiber hackling machine, the combination with the hackling machines having feed and changing ends, of a channel track connecting the filling ends, holders comprising upper and lower plates adapted to travel on said track, a vertically reciprocating slide mounted upon a standard above said track, means operatively carried by said slide adapted to tighten said holders, said means comprising a cylinder secured to each side of the slide, a sliding spring-controlled sleeve in each of said cylinders, a pressure shoe carried by each of said sleeves, side pieces on said shoes, eccentric rods operating in said sleeves, a pair of spring-controlled fingers carried by each of said rods and oppositely operated thereby, and means carried by the holder adapted to be engaged by said fingers.

9. In a fiber hackling machine, the combination with the hackling machines, of a track connecting their filling ends, holders working in said track, a slide mounted above said track, an upper and lower plate upon said holders, a pair of shoes on said slide, operating rods for each of said shoes, a pair of spring controlled fingers carried by one of said rods, a pair of spring controlled fingers carried by the other of said rods, lock bolts upon the upper plate of said holder, lugs upon said lock bolts, means for operating the first mentioned set of fingers upon a downward motion of the slide to expand the fingers to engage the lock bolt lugs to unlock the same to release the upper plate, and means for operating the second mentioned set of fingers upon an upward motion of the slide to contract the fingers to engage the lock bolt lugs to lock the same and clamp the upper plate, and means carried by said lower plate adapted to receive said lock bolt.

10. In a fiber hackling machine, the combination with the hackling machines, of a channel track connecting the filling ends of said machines, holders adapted to travel in said track, means for locking and unlocking said holders, said means comprising a vertically reciprocating slide mounted above said track, a holder locking shoe on said slide, a holder unlocking shoe on said slide, a plate lifting device between said shoes, said device comprising a tilting arm, and means operatively connecting said slide with said arm.

11. In an automatic tightening device for the holders of fiber hackling machines, said holders, comprising upper and lower plates, the combination with a vertically reciprocating slide, of plate lifting means carried by said slide and comprising a tilting arm, means operatively connecting said slide with said arm, said means comprising a guide, frictionally controlled means working in said guide, a pair of jaws on said arm, springs controlling said jaws, means carried by the upper plate of said holder adapted to be engaged by said jaws, and means for operating said jaws to engage said means.

12. In fiber hackling machines of the kind described, the combination of a channel track connecting the changing ends of said machines, a slide adapted to vertically rise and descend above the said track, a shoe for unlocking the holder lids and a shoe for locking same, carried by said slide, a lifting device for the holder lids positioned between the said shoes and comprising a stationary forked pair of jaws, hooks carried by the said jaws and having the shape of inclined planes rising slightly in the direction of the advancing of the holders so as to raise slightly the unlocked lids of the latter in order to set the fibers free, a lower jaw, a frictional sliding rod carrying said jaw, the said jaw being adapted to serve as a support for the said fibers, an upper jaw, a cable adapted to suspend the said upper jaw from the said slide, a counterweight which is sufficiently heavy to overcome the friction of the rod carrying the said lower jaw and to thus carry on the fiber which is pulled from the holder on the desired length, means for adjusting this length at will, a rod carrying the said upper jaw, and an arm carried by the last named rod and adapted to carry on the said rod of the lower jaw upward, after the said slide and the said upper jaw have started rising, when the said lower jaw remains behind the said upper jaw, substantially as and for the purpose set forth.

13. In fiber hackling machines of the kind described, the combination of a direct channel connecting the ends of said hackling machines, of means adapted to tilt the said holders when leaving the heads of said machines, from the edge-wise position into the flat position in readiness to engage the said channel, the said means comprising an arm, a lever integral with said arm, a counterweight on said lever, an abutment adapted to coöperate with said lever when the said head of the machines arrives at the lower end of its stroke, a lateral auxiliary channel made integral with the said head and adapted to receive the holders when the latter have been tilted by a blow from the said arm, whereafter the holders are picked up by one of the dogs of the channel, substantially as and for the purpose set forth.

14. In fiber hackling machines of the kind described the combination of a direct channel connecting the ends of said hackling machines, of means adapted to place the holders on edge again previous to penetrating into the heads of the said hackling machines, these means comprising a channel adapted to oscillate along one of its edges on an axis which is integral with the head of the hackling machine and which, when this head is at the bottom end of its stroke, is positioned in line with the connecting track so as to be adapted to receive the holder in a flat position, and means for tilting the said channel, these means comprising a counterweight adapted to act when the head of the hackling machine rises, and means for causing the said holders to advance, substantially as and for the purpose set forth.

15. In a fiber hackling machine, the combination with said machine, of a carrier for the fiber to be hackled, said carrier comprising a float carrying the said carrier on its top, a receptacle for the liquid adapted to receive said float and means for vertically guiding the said float in the said receptacle, substantially as and for the purpose set forth.

In testimony whereof I have hereunto set my hand in presence of two witnesses.

VICTOR HUGLO.

Witnesses:
Y. W. WINFLY,
EMILE TITON.

---

Copies of this patent may be obtained for five cents each, by addressing the "Commissioner of Patents, Washington, D. C."